US012136102B1

(12) United States Patent
Weiss

(10) Patent No.: US 12,136,102 B1
(45) Date of Patent: *Nov. 5, 2024

(54) COUPON CLEARINGHOUSE WITH BLOCKCHAIN

(71) Applicant: WALGREEN CO., Deerfield, IL (US)

(72) Inventor: Benjamin Weiss, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,238

(22) Filed: Dec. 8, 2021

Related U.S. Application Data

(63) Continuation of application No. 15/954,895, filed on Apr. 17, 2018.

(51) Int. Cl.
   *G06Q 30/02* (2023.01)
   *G06Q 30/0207* (2023.01)
   *H04L 9/30* (2006.01)

(52) U.S. Cl.
   CPC ......... *G06Q 30/0239* (2013.01); *H04L 9/30* (2013.01)

(58) Field of Classification Search
   CPC .............................. G06Q 30/0239; H04L 9/30
   See application file for complete search history.

(56) References Cited

U.S. PATENT DOCUMENTS

| 2011/0099028 | A1* | 4/2011 | van der Veen | G06Q 20/10 |
| | | | | 705/2 |
| 2017/0140408 | A1* | 5/2017 | Wuehler | G06Q 30/0207 |
| 2017/0364936 | A1* | 12/2017 | Balfour | G06Q 20/204 |
| 2018/0150922 | A1* | 5/2018 | Lyman | G06Q 50/14 |
| 2018/0264347 | A1* | 9/2018 | Tran | G06V 40/28 |
| 2018/0349621 | A1* | 12/2018 | Schvey | G06F 21/62 |
| 2019/0213048 | A1* | 7/2019 | Mason | G06F 9/5072 |

OTHER PUBLICATIONS

University of Chicago, "What is the Business Potential of Blockchain?" Chana Schoenberger, Chicago Booth Magazine https://www.chicagobooth.edu/magazine/business-potential-blockchain (Year: 2018).*

(Continued)

*Primary Examiner* — Breffni Baggot
(74) *Attorney, Agent, or Firm* — MARSHALL, GERSTEIN & BORUN LLP; Randall G. Rueth

(57) ABSTRACT

Systems and methods are disclosed for manipulating and accessing a blockchain containing coupon authentication information for coupon processing services to process a coupon maintained by a network of nodes including a first node and a second node. A method may include generating, by the first node, a first coupon transaction that includes a smart coupon contract and broadcasting the first coupon transaction to the second node communicatively coupled to the network. The second node is configured to apply a set of consensus rules to validate the smart coupon contract included in the first coupon transaction prior to adding the first coupon transaction onto the blockchain, causing any one of the network of nodes to execute the smart coupon contract against input data after the first coupon transaction is validated and added onto the blockchain.

20 Claims, 9 Drawing Sheets

(56) References Cited

OTHER PUBLICATIONS

University of Chicago "Blockchain's Weakest Links", Chana Schoenberger, Chicago Booth Review https://review.chicagobooth.edu/economics/2018/article/blockchain-s-weakest-links (Year: 2018).*

Chana Schoenberger, University of Chicago, "What is the Business Potential of Blockchain?", Chicago Booth Magazine, retrieved from the Internet at: <https://chicagobooth.edu/magazine/business-potential-blockchain> on Nov. 26, 2018.

Chana Schoenberger, University of Chicago, "Blockchain's Weakest Links", Chicago Booth Review, retrieved from the Internet at: <https://review.chicagobooth.edu/economics/2018/article/blockchain-s-weakest-links> on Nov. 26, 2018.

Wiley Encyclopedia of Computer Science and Engineering (2009).

\* cited by examiner

COUPON CLEARINGHOUSE WITH BLOCKCHAIN

CROSS REFERENCE TO RELATED APPLICATIONS

This application is a continuation of U.S. patent application Ser. No. 15/954,895 entitled "Coupon Clearinghouse with Blockchain" and filed Apr. 17, 2018, which is hereby incorporated herein by reference in their entirety.

FIELD OF DISCLOSURE

The present disclosure relates to using and accessing data stored in a blockchain. In particular, systems and methods are disclosed for interacting with the blockchain and users of the blockchain for coupon processing services.

BACKGROUND

In a typical coupon process, a customer hands a coupon to a cashier of a retailer, who scans the coupon and stores the coupon in the cash drawer. The customer immediately receives the discount marked on the coupon at the register from the retailer. At the end of the day, the coupons stored in the cash drawer are added up as if they were cash, and that amount is added to the cash sum to be sure the overall total for the cash drawer is accurate. The coupons are sent to the retailer's corporate headquarters, typically once a week. The coupons are processed manually (e.g., a person boxes all of the coupons organized by the individual retailers from which the coupons came from) and ships them to a third-party clearinghouse. The clearinghouse has to sort through millions of coupons, largely by hand. For example, the clearinghouse separates the coupons by manufacturer. As another example, the clearinghouse separates undamaged coupons having scannable UPC codes from damaged (torn, smudged, etc.) coupons. The clearinghouse may place scannable coupons faced up on a conveyor belt, where they are moved along under a scanner that reads the UPC codes, tallies the amounts, and adds up the total value of each manufacturers' coupons. Damaged coupons that cannot be scanned have to be sorted by hand again and analyzed separately. Due to the volume of coupons, some clearinghouses pay other clearinghouses to assist in the sorting. The clearinghouse then sends all the sorted coupons with an invoice to the manufacturer. The manufacturer may then reimburse the clearinghouse for the value on the invoice, and the clearinghouse may send a check to the retailer for the value of the coupons less shipping and processing fees. Alternatively, the manufacturer may send a check directly to the retailer, and the retailer may pay the clearinghouse for its efforts. The whole cycle may vary depending on the volume of coupons, and sometimes may even take months.

The clearinghouse may act as a trusted central authority between the manufacturer and retailer. In doing so, the clearinghouse may validate the coupon (e.g., by verifying that the customer used a valid coupon and purchased a product eligible for a discount as indicated on the coupon). Upon validation, the clearinghouse may communicate its findings to the manufacturer and/or retailer, or simply carry out the coupon processing.

Traditionally, retailers, manufacturers, and/or clearinghouses have stored information related to coupon transactions, and records of coupon transactions, in central databases, which have been used in accounting to track coupon transactions and information related to those coupon transactions. Such databases must be reconciled to achieve consensus as to the validity of the information stored in the databases. However, one of the drawbacks of using central databases to validate information is that because all of the contents of the central database are stored in the memory of a particular computer system, any entity with access to that system can destroy or corrupt the information.

BRIEF SUMMARY

In one aspect, a computer-implemented method for manipulating and accessing a blockchain containing coupon authentication information for coupon processing services maintained by a network of nodes including a first node and a second node, each of the first node and the second node maintaining a copy of the blockchain may be provided. The method may include, via a first node communicatively coupled to the network, generating a first coupon transaction that includes a smart coupon contract. The smart coupon contract comprises executable code, defined by the first node, that permits the first node to manage and/or process usage of the coupon, wherein the executable code is configured to (i) receive input data from a second transaction that invokes the executable code and (ii) process the input data against one or more functions included in the smart coupon contract to determine a state of the second coupon transaction. The method may further include broadcasting, via wired communication, or wireless communication or data transmission over one or more radio frequency links or communication channels, the first coupon transaction to the second node communicatively coupled to the network. The second node may be configured to apply a set of consensus rules to validate the smart coupon contract included in the first coupon transaction prior to adding the coupon transaction(s) onto the blockchain, causing any one of the network of nodes to execute the smart coupon contract against the input data after the first coupon transaction is validated and added onto the blockchain. For example, the second node may validate the first coupon transaction by generating a cryptographic hash for the block of the first coupon transaction, solving a cryptographic puzzle involving the hash of the block of the first coupon transaction, and transmitting the solution to the cryptographic puzzle to other nodes of the network. If the first coupon transaction is validated, the method may further include adding the first coupon transaction onto the blockchain. Alternatively, if the first coupon transaction is not validated, the method may reject the first coupon transaction (e.g., not add the first coupon transaction onto the network), and/or generate and communicate confirmation that the first coupon transaction is not valid to at least another node of the network. The method may include additional, less, or alternate actions, including those discussed elsewhere herein.

In yet another aspect, a first node communicatively coupled to a network of nodes including the first node and a second node for manipulating and accessing a blockchain for coupon authentication for coupon processing services may be provided. The first node may include a memory configured to store non-transitory computer executable instructions, and a processor configured to interface with the memory. The processor may be configured to execute non-transitory computer executable instructions. The non-transitory computer executable instructions may cause the processor to generate a first coupon transaction that includes a smart coupon contract. The smart coupon contract comprises executable code, defined by the first node, that permits the first node to manage and/or process usage of the coupon, wherein the executable code is configured to (i) receive input data from a second transaction that invokes the executable code and (ii) process the input data against one or more functions included in the smart coupon contract to determine a state of the second coupon transaction. The non-transitory computer executable instructions may further cause the processor to broadcast, via wired communication, or wireless communication or data transmission over one or more radio frequency links or communication channels, the first coupon transaction to the second node communicatively coupled to the network. The second node may be configured to apply a set of consensus rules to validate the smart coupon contract included in the first coupon transaction prior to adding the first coupon transaction onto the blockchain, causing any one of the network of nodes to execute the smart coupon contract against the input data after the first coupon transaction is validated and added onto the blockchain. For example, the second node may validate the first coupon transaction by generating a cryptographic hash for the block of the first coupon transaction, solving a cryptographic puzzle involving the hash of the block of the first coupon transaction, and transmitting the solution to the cryptographic puzzle to other nodes of the network. If the first coupon transaction is validated, the non-transitory computer executable instructions may further cause the processor to add the first coupon transaction onto the blockchain. Alternatively, if the first coupon transaction is not validated, the non-transitory computer executable instructions may further cause the processor to reject the first coupon transaction (e.g., not add the first coupon transaction onto the network), and/or generate and communicate confirmation that the first coupon transaction is not valid to at least another node of the network. The non-transitory computer executable instructions may cause the processor to perform additional, less, or alternate actions, including those discussed elsewhere herein.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

The present embodiments relate to, inter alia, systems and methods for using a blockchain to perform services related to coupon dispensing and processing. In particular, the systems and methods may allow for a distributed consensus amongst manufacturers that issue coupons, and retailers that offer such coupons to its customers, as to the validity of information and transactions stored on the blockchain, without using a traditional clearinghouse. The coupon may be represented by a novel data structure herein described as a "smart coupon contract," which includes executable code and coupon data, that permits a manufacturer and retailer to manage and process coupon usage without using a traditional clearinghouse. The executable code may be configured to monitor certain coupon usage conditions to aid the manufacturer in dynamically modifying the coupons after issuance to the retailer, as well as to automatically reimburse the retailer. The retailer may be notified of the coupon data (e.g., a certain product is discounted by a certain dollar amount) in order for the retailer to advertise the coupon data to its customers.

The manufacturers and retailers may all be considered participant nodes in the blockchain network, which may be open and permissionless, or closed and permissioned. The manufacturers and retailers may maintain nodes that are part of the blockchain network, but may also maintain its own systems and networks that may interface with the blockchain network. The terms "manufacturer" and retailer" are used in the present embodiments in the sense that manufacturers may provide coupons to retailers for discounts on products or services made/offered by the manufacturer. It should be contemplated that retailers may be entities (e.g., brick and mortar store, online store, installer, dealer, reseller) that provide discounts to customers on products or services made/offered by the manufacturers.

Figure 1:
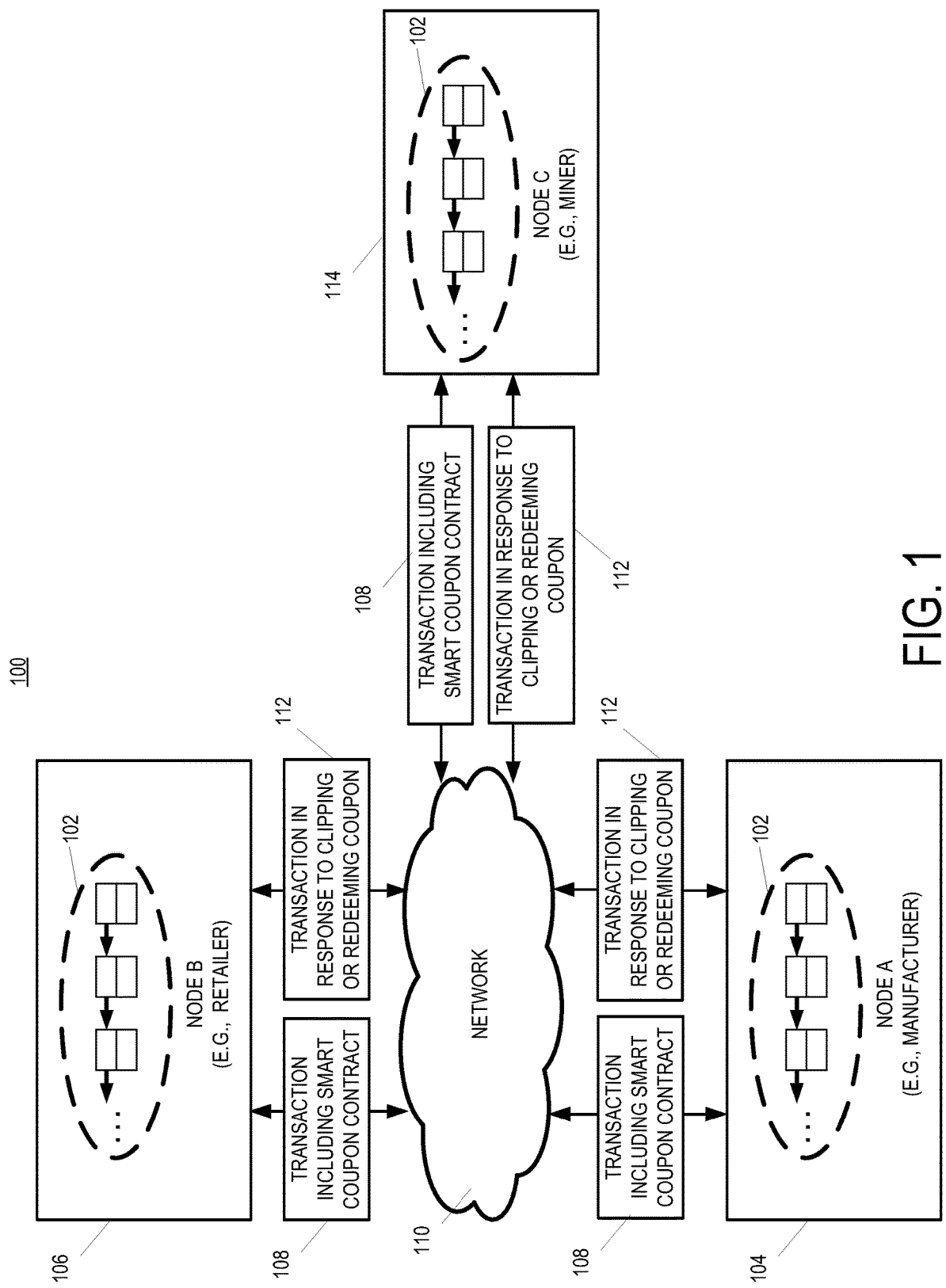
FIG. 1 depicts an exemplary distributed ledger system in accordance with one aspect of the present disclosure.

FIG. 1 depicts an example distributed ledger system 100 in accordance with one aspect of the present disclosure. The distributed ledger system 100 may utilize a distributed ledger 102, commonly referred to as a "blockchain." As such, distributed ledger 102 may be used interchangeably with "blockchain 102" or "blockchain" in the present disclosure. Generally, a blockchain may be utilized to obtain a distributed consensus on the validity or invalidity of information. As opposed to using a central authority, a blockchain is a distributed database or ledger, in which a transactional record is maintained at each node of a peer to peer network. Commonly, the distributed ledger is comprised of groupings of transactions bundled together into a "block." When a change to the distributed ledger is made (e.g., when a new transaction and/or block is created), each node must form a consensus as to how the change is integrated into the distributed ledger. Upon consensus, the agreed upon change is pushed out to each node so that each node maintains an identical copy of the updated distributed ledger. Any change that does not achieve a consensus is ignored. Accordingly, unlike a traditional system that uses a central authority, a single party in a blockchain network cannot unilaterally alter the distributed ledger. This inability to modify past transactions lead to blockchains being generally described as trusted, secure, and/or immutable. Blockchains may be open and permissionless, or closed and permissioned.

FIG. 1 includes a plurality of nodes 104, 106, and 114 connected via a network 110, and the distributed ledger 102. Although only three nodes are illustrated, it is contemplated that more or less nodes may be connected to the network 110 and the distributed ledger 102. In the distributed ledger system 100, each of the plurality of nodes 104, 106, and 114 keeps a copy of the distributed ledger 102. As changes are made to the distributed ledger 102, each node updates its copy of the distributed ledger 102. A consensus mechanism may be used by the nodes in the distributed ledger system 100 to decide when it is appropriate to make changes to the distributed ledger 102. Therefore, each node has its own copy of the distributed ledger 102, which is identical to every other copy of the distributed ledger 102 stored by each other node.

Nodes 104 and 106 may generate and send transactions to each other. For example, node 104 (e.g., a manufacturer) may generate and send transactions to issue coupons to node 106 (e.g., a retailer) by recording the transactions onto the blockchain 102. As such, node 104 may be used interchangeably with "manufacturer," and node 106 may be used interchangeably with "retailer" in the present disclosure. Node 106, in response to retailer customers clipping or redeeming coupons, may generate and send transactions to node 104 by recording the transactions onto the blockchain 102.

Figure 6:
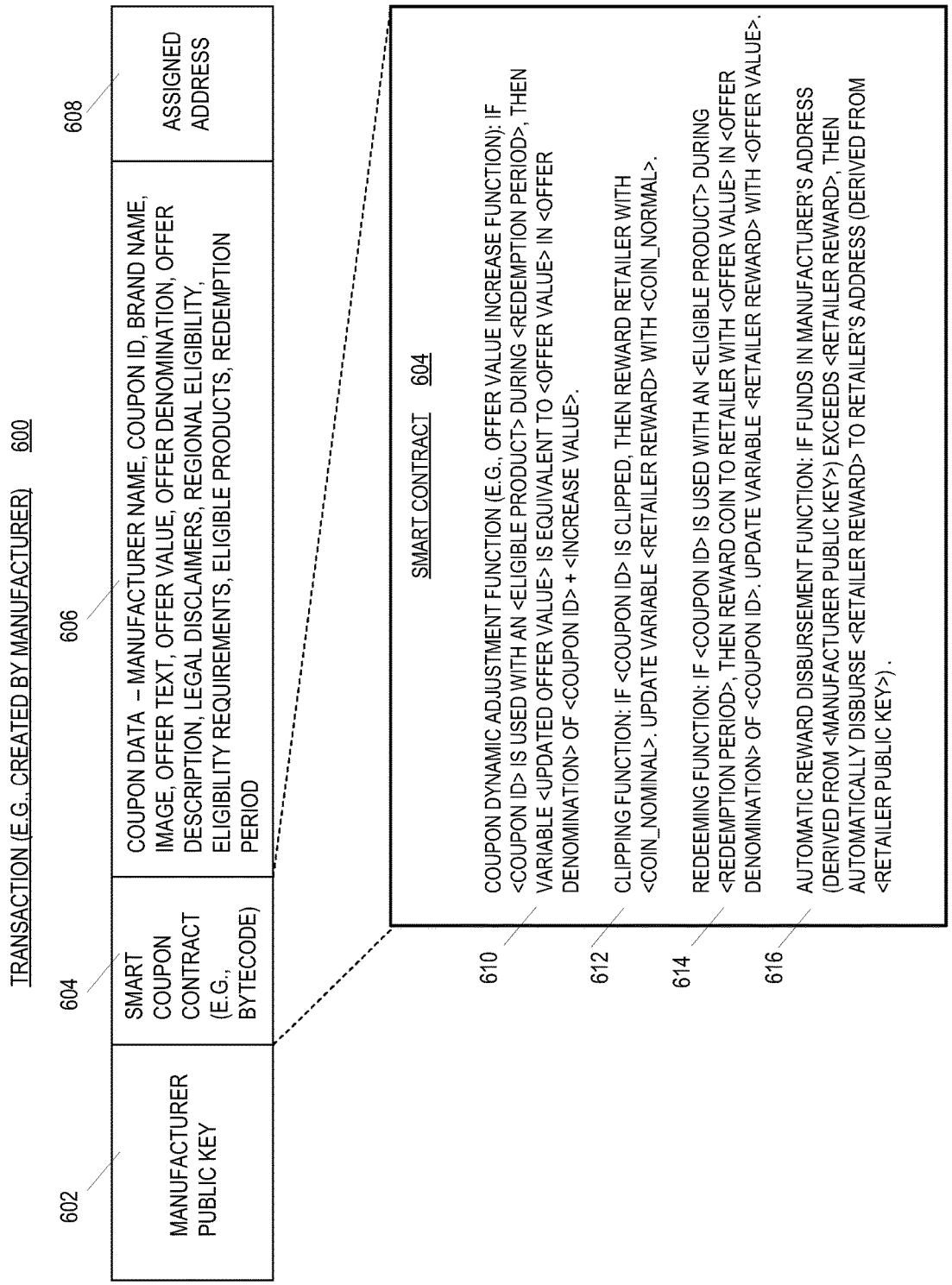
FIG. 6 depicts an exemplary transaction in accordance with one aspect of the present disclosure.

As shown in FIG. 1, node 104 may generate transaction 108 indicating an issued coupon that is represented as a smart coupon contract, which will be described in detail with respect to FIG. 6. The transaction 108 may use data that is stored in the distributed ledger 102, or the transaction 108 may use data received by the node 104 from outside the distributed ledger 102, such as from a web server. Node 104 may broadcast the transaction 108 to other nodes on the network 110, such as node 106 and/or node 114 (e.g., a miner). Node 106 and/or node 114, via the network 110, may receive the transaction 108 and validate that the information contained therein is correct. If the information contained in the transaction 108 is not correct, node 106 and/or node 114 may reject the transaction 108 and not propagate the transaction 108 through other nodes (not shown) in the example distributed ledger system 100. If the information contained in the transaction 108 is correct, the node that successfully validates the transaction 108 (e.g., either node 106 or node 114) may transmit the transaction 108 to other nodes (not shown) communicatively coupled to the network 110 in the example distributed ledger system 100. The node that successfully validates the transaction 108 (e.g., either node 106 or node 114) may also be rewarded for its computational efforts during validation. In some embodiments, node 106 or node 114 may not transmit the confirmed transaction 108, because there are no further nodes to transmit to, or all the nodes in the network 110 have already received transaction 108.

Similarly, as shown in FIG. 1, node 106 may generate transaction 112 in response to retailer customers clipping or redeeming coupons. The transaction 112 may use data that is stored in the distributed ledger 102, or the transaction 112 may use data received by the node 106 from outside the distributed ledger 102, such as from a web server. Node 106 may broadcast the transaction 112 to other nodes on the network 110. Node 104 and/or node 114, via the network 110, may receive the transaction 112 and validate that the information contained therein is correct. If the information contained in the transaction 112 is not correct, node 104 and/or node 114 may reject the transaction 112 and not propagate the transaction 112 through other nodes (not shown) in the example distributed ledger system 100. If the information contained in the transaction 112 is correct, the node that successfully validates the transaction 112 (e.g., either node 106 or node 114) may transmit the transaction 112 to other nodes (not shown) communicatively coupled to the network 110 in the example distributed ledger system 100. The node that successfully validates the transaction 112 (e.g., either node 104 or node 114) may also be rewarded for its computational efforts during validation. In some embodiments, node 104 or node 114 may not transmit the confirmed transaction 112, because there are no further nodes to transmit to, or all the nodes in the network 110 have already received transaction 112.

In some embodiments, any of the nodes may add the confirmed transaction 108 and/or 112 to its copy of the distributed ledger 102, or to a block of transactions stored in the distributed ledger 102. In some embodiments, confirming the transaction 108 and/or 112 includes checking a cryptographic key-pair for participant nodes involved in the generation of the transactions 108 and/or 112 (e.g., nodes 104 and 106). Checking the cryptographic key-pair may follow a set method laid out by a consensus mechanism. For example, node 106 or node 114 may receive transaction 108 from node 104 to confirm whether the transaction 108 is valid. Particularly, node 106 or node 114 may solve a cryptographic puzzle and include the solution in a newly generated block as proof of the work done to generate the new block, and, in some embodiments, link the new block to an already existing block on the blockchain 102. This proof of work may require guessing a nonce value. Upon confirming that the transaction 108 is valid, node 106 or node 114 may transmit the transaction 108 to the network 110. Before or after propagating the transaction 108, node 106 or node 114 may add the transaction 108 to its copy of the blockchain 102, particularly to the new block described above on the blockchain 102. Subsequently, other nodes may receive the transaction 108. The other nodes may verify that the transaction 108 is valid by checking the solution to the cryptographic puzzle provided in the new block. If the solution is accurate, then the other nodes may add the new block to its own blockchain 102. Effectively, the nodes that validate the transaction 108 form a consensus that the solution is valid. In other embodiments, the transaction 108 may be added to a pool of transactions until enough transactions exist to add together to create a block.

In a similar manner, for example, node 104 or node 114 may receive transaction 112 from node 106 to confirm whether the transaction 112 is valid. Particularly, node 104 or node 114 may solve a cryptographic puzzle and include the solution in a newly generated block as proof of the work done to generate the new block, and, in some embodiments, link the new block to an already existing block on the blockchain 102. This proof of work may require guessing a nonce value. Upon confirming that the transaction 112 is valid, node 104 or node 114 may transmit the transaction 112 to the network 110. Before or after propagating the transaction 112, node 104 or node 114 may add the transaction 112 to its copy of the blockchain 102, particularly to the new block described above on the blockchain 102. Subsequently, other nodes may receive the transaction 112. The other nodes may verify that the transaction 112 is valid by checking the solution to the cryptographic puzzle provided in the new block. If the solution is accurate, then the other nodes may add the new block to its own blockchain 102. Effectively, the nodes that validate the transaction 112 form a consensus that the solution is valid. In other embodiments, the transaction 112 may be added to a pool of transactions until enough transactions exist to add together to create a block.

More particularly, to create a new block, each transaction within a block may be assigned a hash value (i.e., an output of a cryptographic hash function, such as SHA-256 or MD5). These hash values may then be combined together utilizing cryptographic techniques (e.g., a Merkle Tree) to generate a hash value representative of the entire new block, and consequently the transactions stored in the block. This hash value may then be combined with the hash value of the previous block to form a hash value included in the header of the new block, thereby cryptographically linking the new block to the blockchain. To this end, the precise value utilized in the header of the new block is dependent on the hash value for each transaction in the new block, as well as the hash value for each transaction in every prior block.

According to certain aspects disclosed herein, information stored in blockchain 102 can be trusted, because the hash value generated for the new block and a nonce value are used as inputs into a cryptographic puzzle. The cryptographic puzzle may have a difficulty set by the nodes connected to the network 110, or the difficulty may be set by administrators of the blockchain network. In one example of the cryptographic puzzle, nodes 104, 106, and/or 114 may use the hash value generated for the new block and repeatedly change the value of the nonce until a solution for the puzzle is found. For example, finding the solution to the cryptographic puzzle may involve finding the nonce value that meets certain criteria (e.g., the nonce value begins with five zeros).

When a solution to the cryptographic puzzle is found, nodes 104, 106, and/or 114 provide the solution in the block so that other nodes on network 110 may be able to verify that the solution is the correct solution. Because the solution also depends on the particular hash values for each transaction within the blockchain 102, if a single node attempted to modify any transaction, the solution would not be verified by the other nodes. More particularly, if a single node attempts to modify a prior transaction within the blockchain, a cascade of different hash values are generated for each tier of the cryptographic combination technique. This results in the header for one or more blocks being different than the corresponding header(s) in every other node that did not make the exact same modification.

As a result, the solution generated by the modifying node would not solve the cryptographic puzzle presented to any node without the identical modification. Thus, the version of the new block generated by the modifying node is readily recognized as including an improper modification and is rejected by the consensus. This inability to modify past transactions lead to blockchains being generally described as trusted, secure, and/or immutable.

Figure 8:
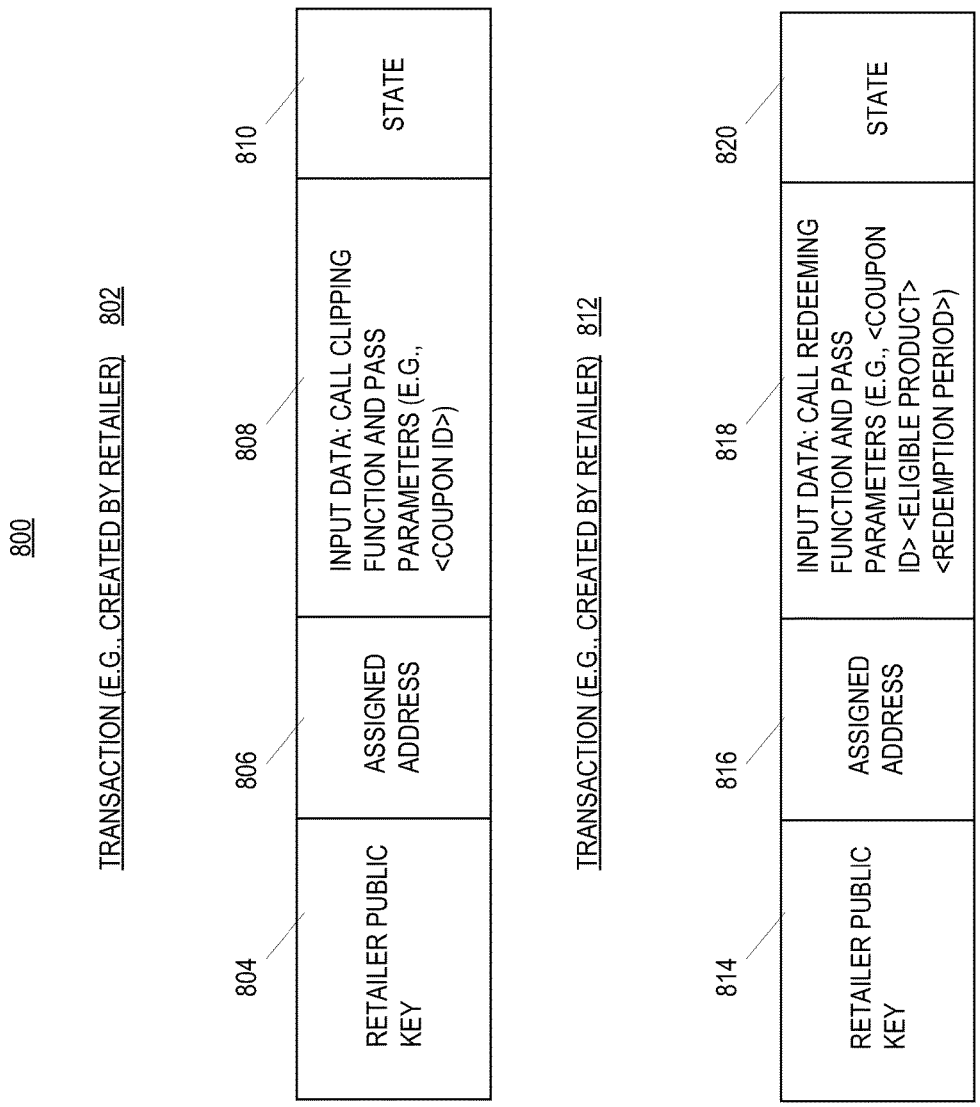
FIG. 8 depicts another exemplary transaction in accordance with one aspect of the present disclosure.

The new block may include at least one transaction (e.g., transactions 108, 112). Generally, a block of transactions has a size limit that necessarily limits the number of transactions that the block may store. The block of transactions includes a reference to a previous block of transactions that was added to the blockchain 102 prior to the block of transactions being added to the blockchain 102. As such, and as described above, each block of transactions is linked to every other block in the blockchain 102. In some embodiments, the block of transactions may organize the transactions it has received into a Merkle Tree to facilitate access to the stored transactions. The transactions may be hashed using a cryptographic hash algorithm, and the hash of each transaction is stored in the tree. As the tree is constructed, the hash of each adjacent node is hashed together to create a new node that exists at a higher level in the tree. Therefore, the root of the tree, or the node at the top of the tree, is dependent upon the hash of each transaction stored in the tree. Each transaction may include a set of data. As will be shown in greater detail with respect to FIGS. 6 and 8, the set of data may include identifying data for the transaction, and transaction data identifying the nature of the transaction and what the transactions entails.

Figure 2:
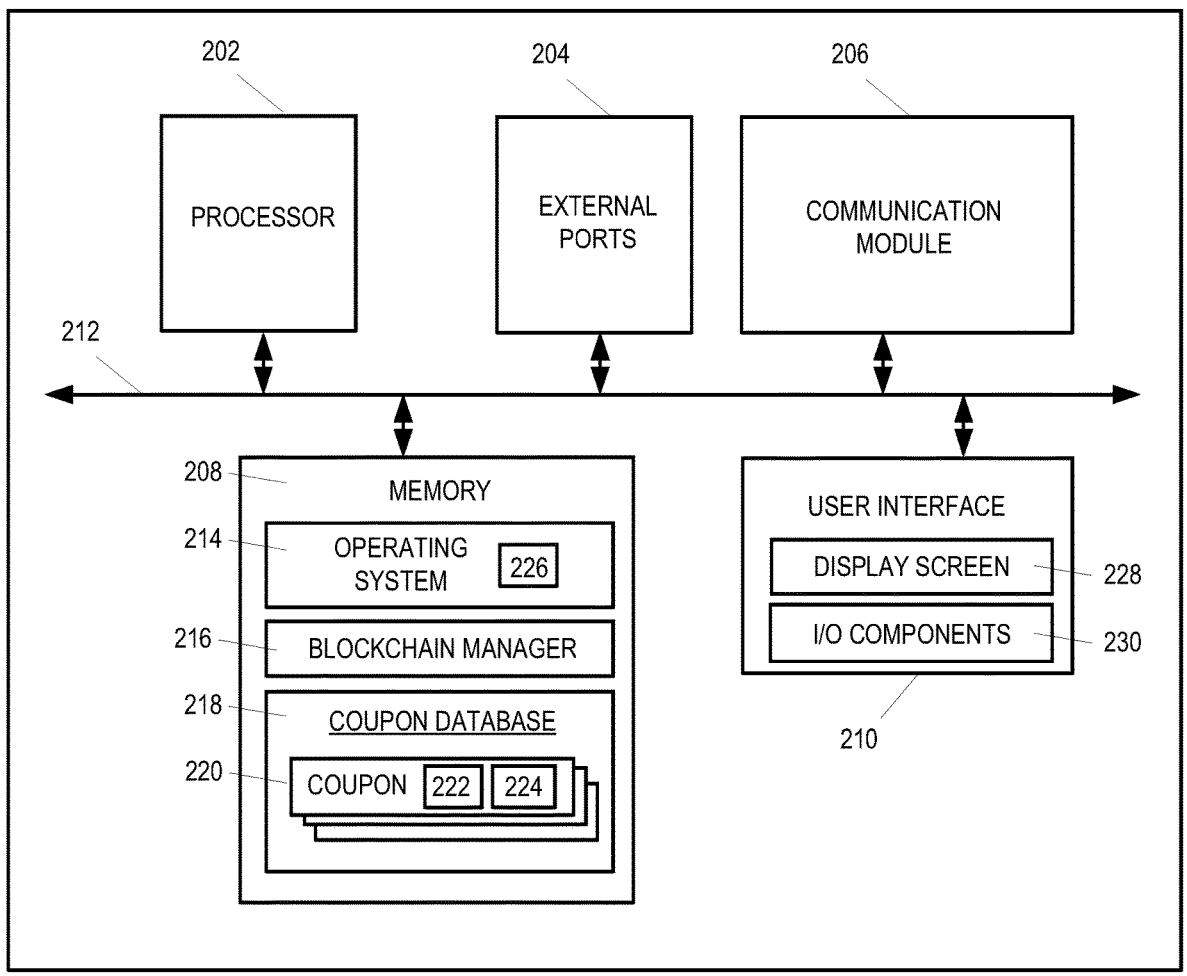
FIG. 2 depicts an exemplary node in accordance with one aspect of the present disclosure.

FIG. 2 depicts an exemplary node 200 in accordance with one aspect of the present disclosure. In some embodiments, node 200 may correspond to nodes 104, 106, and/or 114 shown in FIG. 1. Node 200 includes at least a processor 202, external ports 204, a communication module 206, memory 208, and/or user interface 210, each communicatively coupled to a bus 212. Memory 208 may store an operating system 214, blockchain manager 216, and a coupon database 218 configured to store and track coupons 220. The user interface 210 may include a display screen 228 and input/output components 230. It should be noted that node 200 may include more or less components, and not all nodes may have each of the components described with respect to node 200. For example, nodes 106, and/or 114 may not include a coupon database 218. Generally, node 200 (e.g., a manufacturer), via processor 202, may generate (e.g., via blockchain manager 216) and send (e.g., via communication module 206) transactions to issue coupons 220 to other nodes via the blockchain 102. Similarly, in some embodiments, node 200 (e.g., a retailer), via processor 202, may be capable of generating (e.g., via blockchain manager 216) and sending (e.g., via communication module 206) transactions to other nodes via the blockchain 102 in response to its customers clipping or redeeming coupons 220 via a user application (not shown) stored in memory 208.

Figure 3:
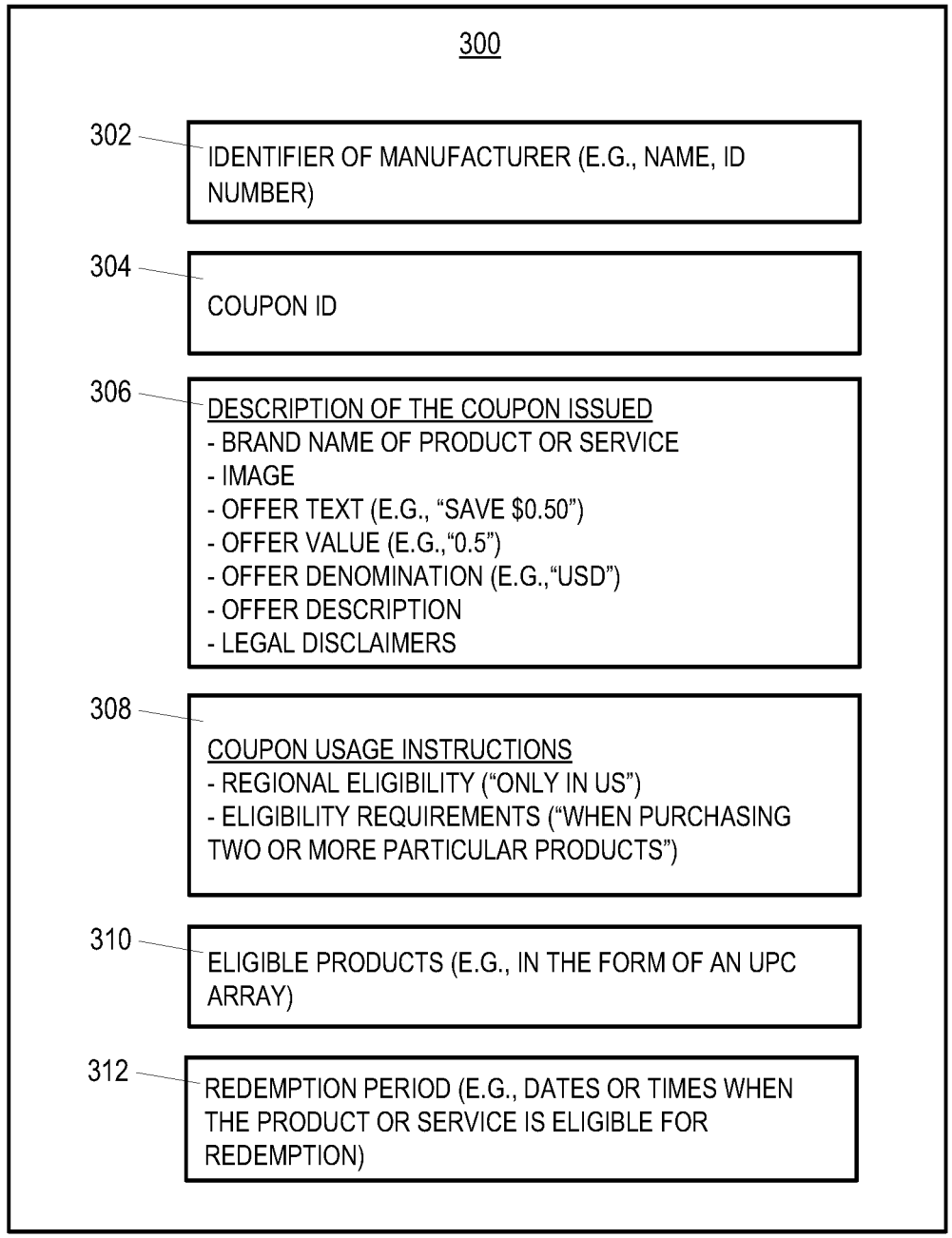
FIG. 3 depicts an exemplary coupon data in accordance with one aspect of the present disclosure.

In some embodiments, node 200 (e.g., a manufacturer) may be capable of creating coupons 220 and storing the coupons 220 in the coupon database 218. The coupon 220 itself may include a data component 222 and a smart coupon contract 224. With reference to FIG. 3, the data component 222 may include data field(s) 300 such as an identifier 302 of its manufacturer (e.g., name, ID number) that is offering the coupon 220 for one of its products or services, a unique coupon ID 304, description 306 of the coupon (e.g., brand name of product or service, image, offer text such as "save $0.50," offer value such as "0.5," offer denomination such as "USD," offer description, legal disclaimers), coupon usage instructions 308 (e.g., regional eligibility such as "only in US," eligibility requirements such as "when purchasing two or more particular products"), eligible products or services 310 (e.g., in the form of an UPC array), redemption period 312 (e.g., dates or times when the product or service is eligible for redemption), and/or other suitable data. In some embodiments, node 200 (e.g., a retailer), by receiving a transaction from node 200 (e.g., a manufacturer) that includes data component 222, may utilize the data component 222 when making available the coupons 220 on its user application to enable its customers to clip and redeem the coupons 220.

Referring back to FIG. 2, the smart coupon contract 224 is computer code that enables the automatic execution and/or enforcement of an agreement associated with coupon 220 between nodes, such as nodes 104 and 106. As will be described further below with respect to FIG. 6, by executing the smart coupon contract 224, node 200 may be able to dynamically update one or more data field(s) 300 of the coupon 220. For example, if coupon 220 is redeemed more than 500 times, node 200 may modify one or more data field(s) 300 (e.g., redemption period, offer value) to shorten the redemption period to void the coupon at an earlier point in time, increase the savings offered to the customer, or other suitable action that adjusts the original values in the data field(s) 300. Accordingly, node 200 (e.g., a manufacturer) may advantageously modify the data component 222 of the coupon 220 automatically without printing out new coupons by configuring the smart coupon contract 224 appropriately.

Figure 4:
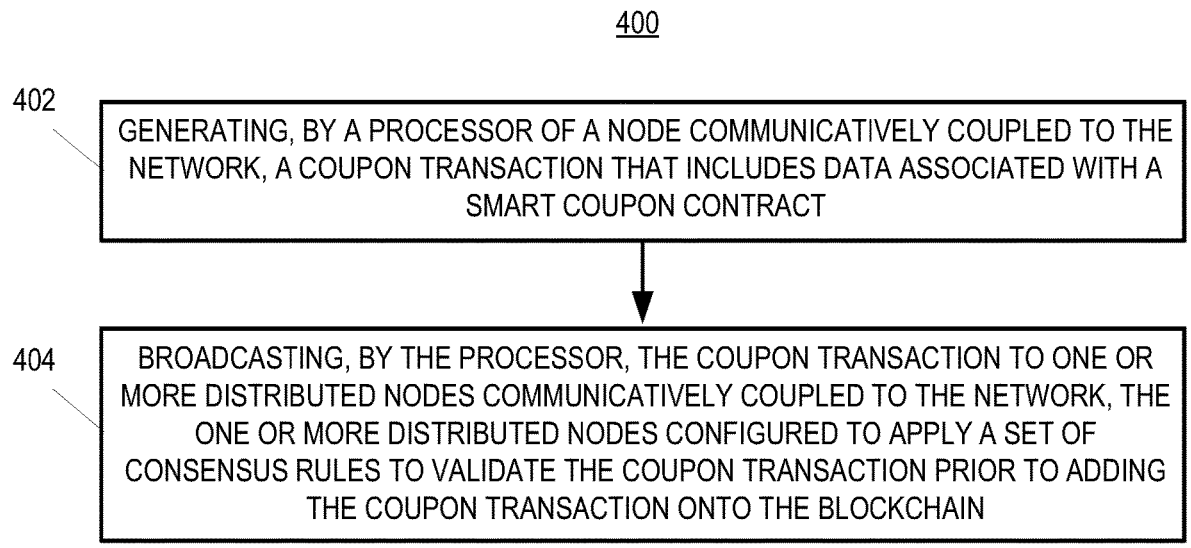
FIG. 4 depicts an exemplary flow diagram associated with one aspect of the present disclosure.

FIG. 4 describes an exemplary flow diagram 400 carried out by a node when generating and broadcasting a coupon transaction. As will be described below, there may be different types of coupon transaction. One type of coupon transaction, generated by node 200 (e.g., a manufacturer), may include the code associated with the smart coupon contract 224. Other types of coupon transaction, such as a "coupon clipping transaction" and "coupon redeeming transaction," may be generated by node 200 (e.g., a retailer) after the coupon transaction including the smart coupon contract 224 has already been validated (and therefore already on the blockchain 102). The coupon clipping transaction and coupon redeeming transaction may each include input data that may be processed by the code associated with the smart coupon contract 224 when validated and added onto the blockchain 102.

The exemplary flow diagram 400 may begin with block 402. As shown in block 402, a processor of a node may generate a coupon transaction that includes data associated with a smart coupon contract. By way of example, node 200 (e.g., a manufacturer) may deploy an instance of the smart coupon contract 224 onto the blockchain 102. Specifically, node 200 (e.g., via blockchain manager 214 configured to generate a new block of transactions) may generate (e.g., via processor 202) a coupon transaction (e.g., transaction 108) that includes the instance of the smart coupon contract 224 to be recorded onto the blockchain 102. As another example, node 200 (e.g., a retailer) may generate a coupon transaction (e.g., transaction 112) in response to customers clipping or redeeming coupons 220. The coupon transaction may include input data that may be processed by the smart contract 224. Specifically, node 200 (e.g., via blockchain manager 214 configured to generate a new block of transactions) may generate (e.g., via processor 202) a coupon transaction (e.g., transaction 112) that includes input data to be recorded onto the blockchain 102.

As shown in block 404, the processor of the node may then broadcast the coupon transaction to the distributed nodes on the network. The distributed nodes may be configured to apply a set of consensus rules to validate the coupon transaction prior to adding the coupon transaction onto the blockchain. By way of example, node 200 (e.g., a manufacturer) may broadcast the coupon transaction (e.g., transaction 108) to other nodes 200, and upon reaching a consensus from other nodes 200 (e.g., a retailer, a miner) that validate the smart coupon contract 224, the transaction (e.g., transaction 108) may be validated and actually added to the blockchain 102 as a validated transaction. At this point, because each node of the network has a copy of the blockchain 102 updated with the validated transaction, all nodes 200 on the network may each have the capability to execute the smart coupon contract 224. For example, the smart coupon contract 224 itself may be executed in a secure platform, such as an Ethereum platform or other suitable platform. As each node 200 may execute the smart coupon contract 224, each node 200 may include the secure platform to execute the smart coupon contract 224. For example, as shown in FIG. 2, node 200 may include a virtual machine platform 226, such as an Ethereum Virtual Machine (EVM), which may run as an application inside the operating system 214. As such, the EVM may be a runtime environment for the smart coupon contract 224.

As another example, node 200 (e.g., a retailer) may broadcast the coupon transaction (e.g., transaction 112) having input data to other nodes 200, and upon reaching a consensus from other nodes 200 (e.g., a manufacturer, a miner) that validate the coupon transaction, the coupon transaction may be validated and actually added to the blockchain 102 as a validated transaction. At this point, because each node of the network has a copy of the blockchain 102 updated with the validated transaction, all nodes 200 on the network may each have the capability to execute the smart coupon contract 224 against the input data included in the coupon transaction in the EVM or suitable environment.

Figure 5:
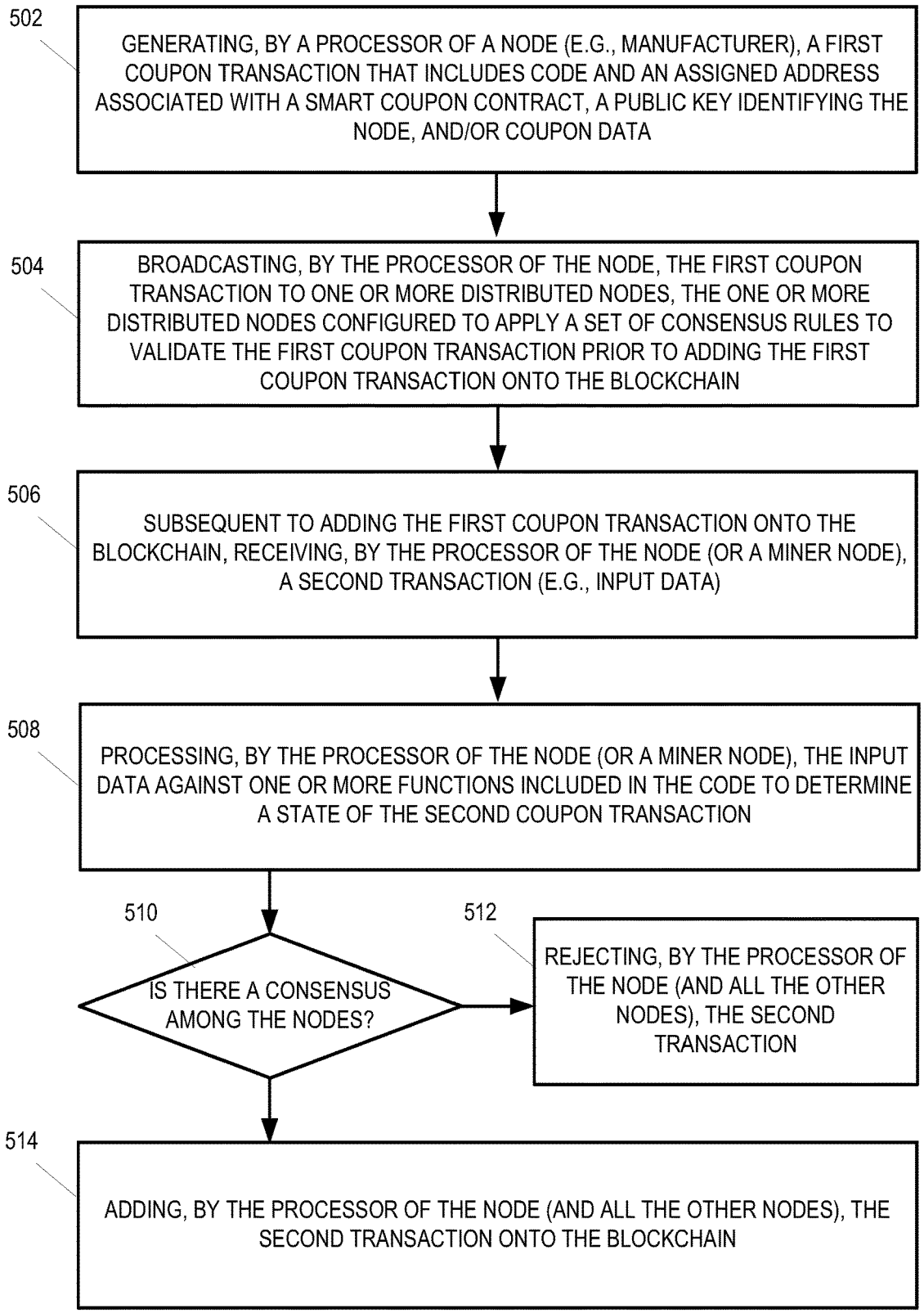
FIG. 5 depicts another exemplary flow diagram associated with one aspect of the present disclosure.

FIG. 5 describes an exemplary flow diagram 500 carried out by node 200 (e.g., a manufacturer) when generating/broadcasting a coupon transaction (e.g., transaction 108) and receiving/processing another coupon transaction (e.g., transaction 112). For ease of explanation, each of the blocks illustrated in FIG. 5 will be described with respect to transaction 600 of FIG. 6, transaction 800 of FIG. 8, and blockchain 900 of FIG. 9. Transactions 600 and 800 correspond to transactions 108 and 112 of FIG. 1, respectively.

The exemplary flow diagram 500 may begin with block 502. As shown in block 502, the processor of the node may generate a coupon transaction that includes code and an assigned address associated with a smart coupon contract, a public key identifying the node, and/or coupon data. By way of example, node 200 (e.g., a manufacturer) may generate (e.g., via processor 202) a coupon transaction (e.g., transaction 600) that includes a manufacturer public key 602, coupon data 606, and the instance of the smart coupon contract 604 at an assigned address 608 to be added to the blockchain 102. The manufacturer public key 602 may serve to identify the identity of the manufacturer that generated the coupon transaction 600. Because embodiments described herein do not include a clearinghouse to act as a trusted central authority between the manufacturer and retailer, the manufacturer public key that identifies the manufacturer advantageously serves to build trust between the manufacturer and retailer. This way, the retailer knows which manufacturer is offering coupons for its use. The coupon data 606 may correspond to one or more data field(s) 300 referred to in FIG. 3. Accordingly, whenever the manufacturer desires to create coupons and communicate coupon data 606 corresponding to the coupons to retailers, the manufacturer may generate transactions 600 corresponding to each of the coupons to be added onto the blockchain 102. The distributed characteristic of the blockchain 102 allows retailers to view the transactions 600 (and therefore the coupons) on the blockchain 102, and incorporate, based on the coupon data 606, the coupons into a website or user application associated with the retailer, for the retailer to make the coupons available to its customers via their mobile devices for example. The code associated with smart coupon contract 604 may include various functions (e.g., functions 610, 612, 614, and 616) and variables (e.g., <UPDATED OFFER VALUE>, <RETAILER REWARD>) corresponding to those functions. In some embodiments, the code may be packaged into a bytecode or other suitable format that is assigned an address 608. In such embodiments, the virtual machine platform 226, such as EVM, may be configured to read the bytecode or other suitable format at the assigned address 608 to execute the code associated with smart coupon contract 604.

Figure 9:
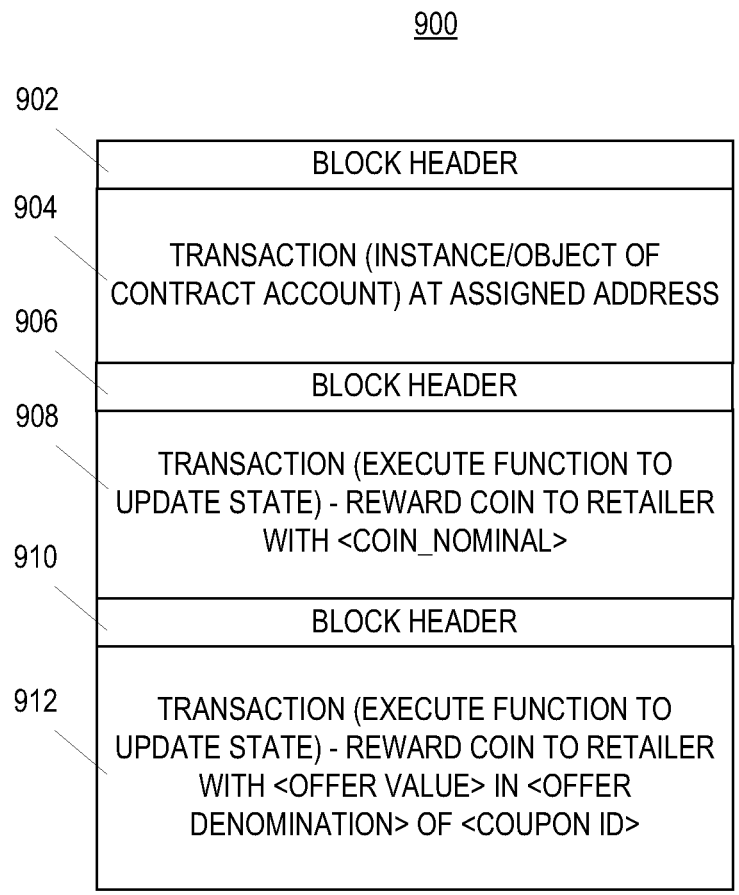
FIG. 9 depicts an exemplary blockchain in accordance with one aspect of the present disclosure.

As shown in block 504, the processor of the node may then broadcast the coupon transaction to the distributed nodes on the network. The distributed nodes may be configured to apply a set of consensus rules to validate the coupon transaction prior to adding the coupon transaction onto the blockchain. By way of example, node 200 (e.g., a manufacturer) may broadcast the coupon transaction (e.g., transaction 600) to other nodes 200 (e.g., retailer, miner), and upon reaching a consensus from other nodes 200 that validate the smart coupon contract 604, the transaction (e.g., transaction 600) may be validated and actually added to the blockchain 102 as a validated transaction. At this point, because each node of the network has a copy of the blockchain 102 updated with the validated transaction, all nodes 200 on the network may each have the capability to execute the smart coupon contract 604 that is at the assigned address 608. Accordingly, to build trust concerning the manufacturer's smart coupon contract 604 between the manufacturer and retailer, the retailer may view transaction 600 on the blockchain 102 and execute the smart coupon contract 604 indicated at the assigned address 608 to verify the functionality of the smart coupon contract 604. Upon reaching a consensus from nodes 200 (e.g., a retailer, a miner) that validate the smart coupon contract 604, the transaction 600 may be validated and actually added to the blockchain 102 as a validated transaction. As shown in FIG. 9, transaction 904 corresponding to the transaction 600 may be added to the blockchain 900. A block header 902 associated with transaction 904 may store a hash value. The precise value utilized in the block header 902 of the block containing transaction 904 is dependent on the hash value for each transaction 904 in the new block, as well as the hash value for each transaction in every prior block, if it exists.

As shown in block 506, the processor of the node may, subsequent to adding the coupon transaction onto the blockchain, receive a second transaction. In some embodiments, the same node (e.g., a manufacturer) may receive the second transaction. In other embodiments, a different node (e.g., a miner) may receive the second transaction. By way of example, node 200 (e.g., a manufacturer) may receive the second coupon transaction (e.g., transaction 800) provided by another node 200 (e.g., a retailer). Transaction 800 may be of two types. One type of transaction 800 may be coupon clipping transaction 802, which is generated by node 200 (e.g., a retailer) in response to its customer clipping a coupon 220 using its application deployed to the customer's mobile device. The transaction 802 may include a retailer public key 804, assigned address 806, input data 808, and state 810 as a result of executing the smart coupon contract 604 against the input data 808 when transaction 802 is validated. Another type of transaction 800 may be coupon redeeming transaction 812, which is generated by node 200 (e.g., a retailer) in response to its customer redeeming a coupon 220 using its application deployed to the customer's mobile device. Similarly, the transaction 812 may include a retailer public key 814, assigned address 816, input data 818, and state 820 as a result of executing the smart coupon contract 604 against the input data 818 when transaction 812 is validated. The retailer public key 804, 814 may serve to identify the identity of the retailer that generated the respective coupon transaction 800. Because embodiments described herein do not include a clearinghouse to act as a trusted central authority between the manufacturer and retailer, the retailer public key that identifies the retailer advantageously serves to build trust between the manufacturer and retailer. This way, the manufacturer knows which retailer is clipping/redeeming its coupons 220. The assigned address 806, 816 may identify the address (e.g., assigned address 608) at which the smart coupon contract 604 is stored, so that the respective transaction 800 may invoke execution of the smart coupon contract 604.

As shown in block 508, the processor of the node may process the input data against one or more functions included in the code associated with the smart coupon contract 604 to determine a state of the second coupon transaction. By way of example, the input data 808, 818 of the respective transaction 800 may be processed against the smart coupon contract 604 to determine a state 810, 820 of the transaction 800. Particularly, the input data 808, 818 may each include a function caller and parameter data. The function caller may invoke a particular function of the smart coupon contract 604 by indicating the particular function the retailer desires to invoke, and the parameter data may be passed to the invoked particular function. For example, the input data 808 may invoke the clipping function 612 of the smart coupon contract 604, and the input data 818 may invoke the redeeming function 614 of the smart coupon contract 604. Either of the input data 808 or input data 818 may invoke the automatic reward disbursement function 616, but neither of the input data 808 or input data 818 may invoke the coupon dynamic adjustment function 610. Instead, node 200 (e.g., a manufacturer), upon receiving a predetermined number of transactions 600 that is configured in the smart contract 604, may generate a new transaction 600 that executes coupon dynamic adjustment function 610 when the new transaction 600 is validated. Parameter data, such as <COUPON ID>, <ELIGIBLE PRODUCT>, and <REDEMPTION PERIOD> and other suitable parameter data corresponding to one or more field(s) 300, may be passed to the invoked function. Accordingly, the parameter data, which may be one or more data field(s) 300 of the coupon data 606, may be passed as an argument to the particular function, which, upon execution, will update a variable (e.g., <UPDATED OFFER VALUE>, <RETAILER REWARD>) and therefore will update a state 810, 820 corresponding to the function. The state 810, 820 of the transaction 800 may be stored persistently in the blockchain 102 (e.g., via a Merkle tree). Effectively, upon adding the transaction 800 onto the blockchain 102 after reaching a consensus as to its verification, the blockchain 102 may show a full audit trail of states 810, 820 of the smart coupon contract 604.

More particularly, the smart coupon contract 604 may include a function 610 that dynamically adjusts field(s) 300 of the coupon under certain conditions (e.g., a coupon offering a $2.00 discount may dynamically be updated to offering a $4.00 discount if customers of a retailer have redeemed the coupon 20 times or more). Function 610 may keep count of the number of coupon clipping transactions 802 and/or coupon redeeming transactions 812 sent by a retailer by evaluating the input data 808 and/or 818 identified in the coupon clipping transactions 802 and/or coupon redeeming transactions 812 for each coupon clipping transaction 802 and/or coupon redeeming transaction 812. If all conditions are met (e.g., function 610 counts that the retailer provided 20 or more coupon redeeming transactions 812 indicating that customers of a retailer have redeemed the coupon 20 times or more, and the customers used the correct coupon (e.g., identified by the parameter data <COUPON ID>) during the correct redemption period (e.g., identified by the parameter data <REDEMPTION PERIOD>) with eligible products or services (e.g., identified by the parameter data <ELIGIBLE PRODUCT>)), function 610 may update the state 820 of the smart coupon contract 604 by increasing the offer value (e.g., variable <UPDATED OFFER VALUE>) of the coupon. Effectively, upon adding the coupon redeeming transactions 812 onto the blockchain 102 after reaching a consensus as to its verification, the blockchain 102 may show a full audit trail of states 820 of the smart coupon contract 604, and thus may show the present offer value of the coupon at any given time for example. Because the state may reflect the present offer value, for example, embodiments of the present disclosure advantageously avoid the need for manufacturers to manually print new coupons whenever circumstances change. In some embodiments, and with respect to this particular example, the blockchain 102 may only add the retailer's $20^{th}$ coupon redeeming transaction onto the blockchain 102 because the state of the smart coupon contract 604 has not changed until the $20^{th}$ coupon redeeming transaction. In such embodiments, the blockchain 102 may show a full audit trail of changing states of the smart coupon contract 604. In other embodiments, and with respect to this particular example, the blockchain 102 may add all of the retailer's 20 coupon redeeming transactions 812 onto the blockchain 102, even if the state has not changed until the $20^{th}$ coupon redeeming transaction.

As another example, the smart coupon contract 604 may include a function 612 that rewards a retailer under certain conditions (e.g., a manufacturer may give a reward of $0.015 USD to a retailer if a retailer's customer clips a manufacturer's coupon on a mobile device). Function 612 may track a coupon clipping transaction 802 sent by a retailer by evaluating the input data 808 identified in the coupon clipping transactions 802 for each coupon clipping transaction 802. If all conditions are met (e.g., function 612 determines that the retailer's customer clipped the correct coupon (e.g., identified by the parameter data <COUPON ID>)), function 612 may update the state 810 of the smart coupon contract 604 by increasing the reward (e.g., variable <RETAILER REWARD>) corresponding to the clipped coupon for the retailer. Effectively, upon adding the retailer's coupon clipping transaction 802 onto the blockchain 102 after reaching a consensus as to its verification, the blockchain 102 may show a full audit trail of states 810 of the smart coupon contract 604, such as the reward that the retailer has earned for the particular coupon clipping transaction 802. Accordingly, as a plurality of retailer's coupon clipping transactions 802 are added onto the blockchain 102, the blockchain 102 may show a full audit trail of states 810 of the smart coupon contract 604, such as a cumulative total of reward that the retailer has earned. In some embodiments, the manufacturer may view the blockchain 102 periodically or aperiodically as part of its reward disbursement process. For instance, in some embodiments, by viewing the reward or cumulative reward that the retailer has earned for the particular coupon clipping transaction 802 or group of coupon clipping transactions 802, respectively, the manufacturer may manually mail a check to the retailer.

In other embodiments, execution of the smart coupon contract 604 may automatically disburse funds from the manufacturer to the retailer, via function 616. Specifically, the smart coupon contract 604 may include a function 616 that automatically rewards a retailer under certain conditions (e.g., if funds in manufacturer's address, which is derivable from the manufacturer public key 602 exceeds the reward owed to the retailer). Function 616 may track a coupon clipping transaction 802 sent by a retailer by evaluating the input data 808 identified in the coupon clipping transactions 802 for each coupon clipping transaction 802. If all conditions are met (e.g., function 616 determines that the retailer's customer clipped the correct coupon (e.g., identified by the parameter data <COUPON ID>)), function 616 may update the state 810 of the smart coupon contract 604 by disbursing the reward (e.g., variable <RETAILER REWARD>) corresponding to the clipped coupon to the retailer's account, which is derivable from the retailer public key 804. Effectively, upon adding the retailer's coupon clipping transaction 802 onto the blockchain 102 after reaching a consensus as to its verification, the blockchain 102 may show a full audit trail of states 810 of the smart coupon contract 604, such as the reward that the manufacturer has paid the retailer for the particular coupon clipping transaction 802. Accordingly, as a plurality of retailer's coupon clipping transactions 802 are added onto the blockchain 102, the blockchain 102 may show a full audit trail of states 810 of the smart coupon contract 604, such as a cumulative total of reward that the manufacturer has paid the retailer for coupons clipped.

It should be noted that the retailer needs to pay node 200 (e.g., a manufacturer, a miner) for it to validate the coupon clipping transaction 802 so that the retailer's coupon clipping transaction 802 can be added onto the blockchain 102. In some embodiments, the manufacturer may generate the smart coupon contract 604 such that function 612 rewards the retailer for the same amount that the retailer would have to spend for a node 200 to validate a coupon clipping transaction 802. For example, if the retailer needs to pay a miner node 200 $0.015 USD for it to validate a coupon clipping transaction 802, the manufacturer may give a reward of $0.015 USD to a retailer via function 612 if a retailer's customer clips a manufacturer's coupon on a mobile device. In other embodiments, to further incentivize the retailer to use the blockchain 102, the manufacturer may generate the smart coupon contract 604 such that function 612 rewards the retailer for more than the amount that the retailer would have to spend for a node 200 to validate a coupon clipping transaction 802.

As another example, the smart coupon contract 604 may include a function 614 that rewards a retailer under certain conditions (e.g., a manufacturer may give a reward of $2.00 USD to a retailer if a retailer's customer redeems a manufacturer's $2.00 off coupon on a mobile device). Function 614 may track a coupon redeeming transaction 812 sent by a retailer by evaluating the input data 818 identified in the coupon redeeming transactions 812 for each coupon redeeming transaction 812. If all conditions are met (e.g., function 614 determines that the retailer's customer redeemed the correct coupon (e.g., identified by the parameter data <COUPON ID>) during the correct redemption period (e.g., identified by the parameter data <REDEMPTION PERIOD>) with eligible products or services (e.g., identified by the parameter data <ELIGIBLE PRODUCT>)), function 614 may update the state 820 of the smart coupon contract 604 by increasing the reward (e.g., variable <RETAILER REWARD>) corresponding to the redeemed coupon for the retailer. Effectively, upon adding the retailer's coupon redeeming transaction 812 onto the blockchain 102 after reaching a consensus as to its verification, the blockchain 102 may show a full audit trail of states 820 of the smart coupon contract 604, such as the reward that the retailer has earned for the particular coupon redeeming transaction 812. Accordingly, as a plurality of retailer's coupon redeeming transactions 812 are added onto the blockchain 102, the blockchain 102 may show a full audit trail of states 820 of the smart coupon contract 604, such as a cumulative total of reward that the retailer has earned for coupons redeemed. In some embodiments, the manufacturer may view the blockchain 102 periodically or aperiodically as part of its reward disbursement process. For instance, in some embodiments, by viewing the reward or cumulative reward that the retailer has earned for the particular coupon redeeming transaction 812 or group of coupon redeeming transactions 812, respectively, the manufacturer may manually mail a check to the retailer.

In other embodiments, execution of the smart coupon contract 604 may automatically disburse funds from the manufacturer to the retailer, via function 616. Specifically, the smart coupon contract 604 may include a function 616 that automatically rewards a retailer under certain conditions (e.g., if funds in manufacturer's address, which is derivable from the manufacturer public key 602 exceeds the reward owed to the retailer). Particularly, function 616 may track a coupon redeeming transaction 812 sent by a retailer by evaluating the input data 818 identified in the coupon redeeming transaction 812 for each coupon redeeming transaction 812. If all conditions are met (e.g., function 616 determines that the retailer's customer redeemed the correct coupon (e.g., identified by the parameter data <COUPON ID>)), function 616 may update the state 820 of the smart coupon contract 604 by disbursing the reward (e.g., variable <RETAILER REWARD>) corresponding to the redeemed coupon to the retailer's account, which is derivable from the retailer public key 814. Effectively, upon adding the retailer's coupon redeeming transaction 812 onto the blockchain 102 after reaching a consensus as to its verification, the blockchain 102 may show a full audit trail of states 820 of the smart coupon contract 604, such as the reward that the manufacturer has paid the retailer for the particular coupon redeeming transaction 812. Accordingly, as a plurality of retailer's coupon redeeming transaction 812 are added onto the blockchain 102, the blockchain 102 may show a full audit trail of states 820 of the smart coupon contract 604, such as a cumulative total of reward that the manufacturer has paid the retailer.

It should be noted that the retailer needs to pay node 200 (e.g., manufacturer, miner) for it to validate the coupon redeeming transaction 812 so that the retailer's coupon redeeming transaction 812 can be added onto the blockchain 102. In some embodiments, the manufacturer may generate the smart coupon contract 604 such that function 614 rewards the retailer for not only the offer value (e.g., $2.00 USD) of the coupon redeemed, but also to reimburse the retailer for the same amount that the retailer would have to spend for a node 200 to validate a coupon redeeming transaction 812. For example, if the retailer needs to pay a miner node 200 $0.015 USD for it to validate a coupon redeeming transaction 812, the manufacturer may give a reward of $2.015 USD to a retailer via functions 612 and 614 if a retailer's customer clips and redeems a manufacturer's coupon that provides a discount of $2.00 on a mobile device. In other embodiments, the manufacturer may generate the smart coupon contract 604 such that function 614 rewards the retailer for only the offer value (e.g., $2.00 USD) of the coupon redeemed.

As shown in block 510, if there is no consensus among the nodes, the processor of the node may reject the second coupon transaction, as shown in block 512. As shown in block 514, if there is consensus among the nodes, the processor of the node may add the second coupon transaction onto the blockchain.

Figure 7:
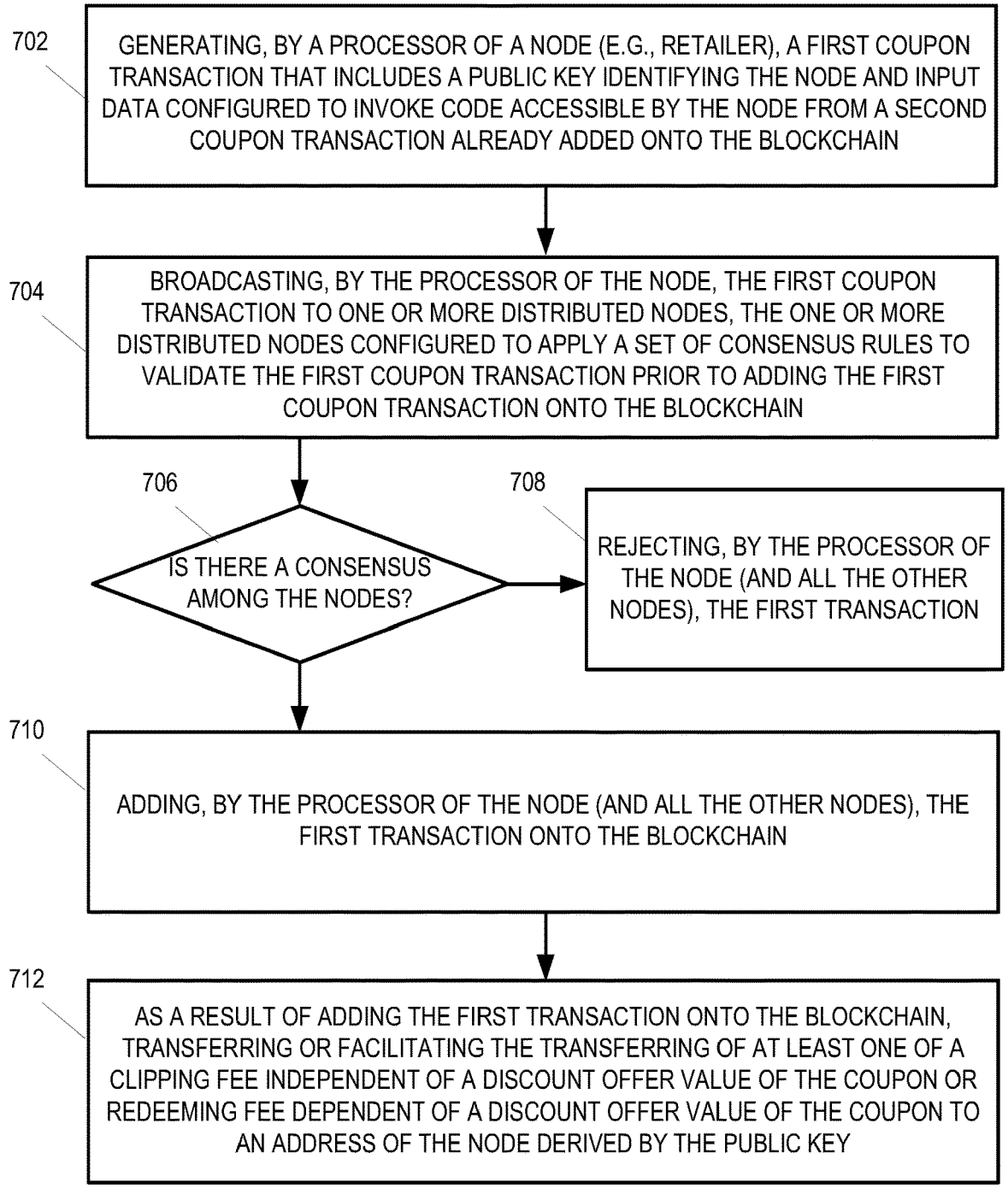
FIG. 7 depicts another exemplary flow diagram associated with one aspect of the present disclosure.

FIG. 7 describes an exemplary flow diagram 700 carried out by node 200 (e.g., a retailer) when generating/broadcasting a coupon transaction (e.g., transaction 112) to add to the blockchain 102. For ease of explanation, each of the blocks illustrated in FIG. 7 will be described with respect to transactions 800 of FIG. 8 corresponding to transaction 112 and blockchain 900 of FIG. 9.

The exemplary flow diagram 700 may begin with block 702. As shown in block 702, the processor of the node may generate a coupon transaction that includes a public key identifying the node, and input data configured to invoke code accessible by the node from the coupon transaction (e.g., transaction 600) that has already been added onto the blockchain 102, such as at block 506 of FIG. 5. For instance, the processor of the node may generate a coupon transaction in response to customers clipping or redeeming coupons. By way of example, node 200 (e.g., a retailer) may generate (e.g., via processor 202) a coupon transaction (e.g., transaction 802, 812) that includes a retailer public key 804, 814, the assigned address 806, 816 of the instance of the smart coupon contract 604, and input data 808, 818. The retailer public key 804, 814 may serve to identify the identity of the retailer that generated the coupon transaction 800. The assigned address 806, 816 may identify the address (e.g. assigned address 608) at which the smart coupon contract 604 is stored.

As shown in block 704, the processor of the node may then broadcast the coupon transaction to the distributed nodes on the network. The distributed nodes may be configured to apply a set of consensus rules to validate the coupon transaction prior to adding the coupon transaction onto the blockchain. By way of example, node 200 (e.g., a retailer) may broadcast the coupon transaction (e.g., transaction 800) to other nodes 200 (e.g., a manufacturer, a miner), and upon reaching a consensus (as shown in block 706) from other nodes 200 that validate the transaction, the transaction (e.g., transaction 800) may be validated and actually added to the blockchain 102 as a validated transaction, as shown in block 710. As shown in FIG. 9, transaction 908 corresponding to the transaction 802 may be added to the blockchain 900. A block header 906 associated with transaction 908 may store a hash value. The precise value utilized in the block header 906 of the block containing transaction 908 is dependent on the hash value for each transaction 908 in the new block, as well as the hash value for each transaction in every prior block, such as transaction 904. As another example, as shown in FIG. 9, transaction 912 corresponding to the transaction 812 may be added to the blockchain 900. A block header 910 associated with transaction 912 may store a hash value. The precise value utilized in the block header 910 of the block containing transaction 912 is dependent on the hash value for each transaction 912 in the new block, as well as the hash value for each transaction in every prior block, such as transactions 904 and 908.

Otherwise, the transaction may be rejected, as shown in block 708. Effectively, upon adding the transaction 800 onto the blockchain 102, the blockchain 102 may show a full audit trail of states 810, 820 of the smart coupon contract 604. For example, upon adding the coupon redeeming transactions 812 onto the blockchain 102, the blockchain 102 may show a full audit trail of states 820 of the smart coupon contract 604, and thus may show the present offer value of the coupon at any given time. As another example, upon adding the retailer's coupon clipping transaction 802 onto the blockchain 102, the blockchain 102 may show a full audit trail of states 810 of the smart coupon contract 604, such as the reward that the retailer has earned for the particular coupon clipping transaction 802. As another example, upon adding the retailer's coupon clipping transaction 802 onto the blockchain 102, the blockchain 102 may show a full audit trail of states 810 of the smart coupon contract 604, such as the reward that the manufacturer has paid the retailer for the particular coupon clipping transaction 802. As another example, upon adding the retailer's coupon redeeming transaction 812 onto the blockchain 102, the blockchain 102 may show a full audit trail of states 820 of the smart coupon contract 604, such as the reward that the retailer has earned for the particular coupon redeeming transaction 812. As another example, upon adding the retailer's coupon redeeming transaction 812 onto the blockchain 102, the blockchain 102 may show a full audit trail of states 820 of the smart coupon contract 604, such as the reward that the manufacturer has paid the retailer for the particular coupon redeeming transaction 812. As described elsewhere herein, the reward that the manufacturer has paid the retailer for the particular coupon clipping transaction 802 may be a predetermined nominal value (e.g., $0.015 USD), and the reward that the manufacturer has paid the retailer for the particular coupon redeeming transaction 812 may be the offer value of the coupon (e.g., $0.015 USD). Accordingly, as shown in block 712, as a result of adding the retailer's coupon clipping transaction 802 and/or retailer's coupon redeeming transaction 812 onto the blockchain 102, node 200 (e.g., a manufacturer) may transfer or facilitate transferring a clipping fee (e.g., $0.015 USD) independent of a discount offer value of the coupon or redeeming fee (e.g., $2.00 USD) dependent of a discount offer value of the coupon to the address of node 200 (e.g., a retailer) that may be derivable from the retailer public key 804, 814. The retailer may access the address of node 200 to retrieve the clipping fee and/or redeeming fee using its private key that corresponds to the public key 804, 814.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner.

In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 100(f) unless traditional means-plus-function language is expressly recited, such as "means for" or "step for" language being explicitly recited in the claim(s).

What is claimed is:

1. A computer-implemented method for manipulating and accessing a blockchain containing coupon authentication information for coupon processing services to process a coupon maintained by a network of nodes including a first node and a second node, each of the first node and the second node maintaining a copy of the blockchain, the method comprising:

generating, by a processor of the first node communicatively coupled to the network, a first coupon transaction that includes a smart coupon contract, wherein the smart coupon contract comprises executable code, defined by the first node, that permits the first node to manage and/or process usage of the coupon, wherein the executable code is configured to (i) receive input data from a second transaction that invokes the executable code and (ii) process the input data against one or more functions included in the smart coupon contract to determine a state of the second coupon transaction; and broadcasting, by the processor, the first coupon transaction to the second node communicatively coupled to the network, the second node configured to apply a set of consensus rules to validate the smart coupon contract included in the first coupon transaction prior to adding the first coupon transaction onto the blockchain, wherein the consensus rules include at least solving a cryptographic puzzle involving the hash of the block of the first coupon transaction, causing any one of the network of nodes to execute the smart coupon contract against the input data after the first coupon transaction is validated and added onto the blockchain;

receiving, by the processor, the second coupon transaction that includes the input data and an assigned address at which the smart coupon contract is stored; and determining, by the processor, the state of the second transaction by invoking execution of the smart coupon contract indicated at the assigned address against the input data included in the second coupon transaction.

2. The computer-implemented method of claim 1, wherein the executable code comprises at least one of:

a coupon modification function configured to modify the state of the second transaction;

a coupon clipping function configured to modify the state of the second transaction;

a coupon redeeming function configured to modify the state of the second transaction; or a reward disbursement function configured to modify the state of the second transaction, wherein the second transaction comprises at least one of a coupon clipping transaction or a coupon redeeming transaction.

3. The computer-implemented method of claim 1, wherein the executable code comprises bytecode that is executable in a virtual machine platform configured in any one of the network of nodes.

4. The computer-implemented method of claim 1, wherein the first coupon transaction further comprises at least one of:

an assigned address corresponding to the executable code;
a public key identifying the first node; or
coupon data.

5. The computer-implemented method of claim 4, wherein the coupon data comprises at least one of:
an identifier of a manufacturer;
an identifier of the coupon;
a description of the coupon;
usage instructions for the coupon;
eligible products or services associated with the coupon; or
a redemption period of the coupon.

6. The computer-implemented method of claim 1, further comprising:
transferring at least one of a clipping fee independent of a discount offer value of the coupon or redeeming fee dependent of a discount offer value of the coupon to an address of the first node derived by the public key in response to invoking the executable code,
wherein the first node is configured with using a private key corresponding to the public key to access the address of the first node to retrieve the at least one of the clipping fee or redeeming fee.

7. The computer-implemented method of claim 1, wherein the input data comprises at least one of:
coupon modification caller and parameter data to invoke a coupon modification function configured to modify the state of the second transaction;
coupon clipping caller and parameter data to invoke a coupon clipping function configured to modify the state of the second transaction;
coupon redeeming caller and parameter data to invoke a coupon redeeming function configured to modify the state of the second transaction; or
reward disbursement caller and parameter data to invoke a reward disbursement function configured to modify the state of the second transaction,
wherein the second transaction comprises at least one of a coupon clipping transaction or a coupon redeeming transaction.

8. The computer-implemented method of claim 7, wherein the state of the coupon clipping transaction in response to invoking the reward disbursement function comprises a transfer of a clipping fee independent of a discount offer value of the coupon for validating the coupon clipping transaction.

9. The computer-implemented method of claim 7, wherein the state of the coupon redeeming transaction in response to invoking the reward disbursement function comprises a transfer of a redeeming fee dependent of a discount offer value of the coupon for validating the coupon redeeming transaction.

10. A first node communicatively coupled to a network of nodes including the first node and a second node for manipulating and accessing a blockchain for coupon authentication for coupon processing services, the first node comprising:
a memory configured to store non-transitory computer executable instructions; and
a processor configured to interface with the memory, wherein the processor is configured to execute the non-transitory computer executable instructions to cause the processor to:
generate a first coupon transaction that includes a smart coupon contract, wherein the smart coupon contract comprises executable code, defined by the first node, that permits the first node to manage and/or process usage of the coupon, wherein the executable code is configured to (i) receive input data from a second transaction that invokes the executable code and (ii) process the input data against one or more functions included in the smart coupon contract to determine a state of the second coupon transaction; and
broadcast the first coupon transaction to the second node communicatively coupled to the network, the second node configured to apply a set of consensus rules to validate the smart coupon contract included in the first coupon transaction prior to adding the first coupon transaction onto the blockchain, wherein the consensus rules include at least solving a cryptographic puzzle involving the hash of the block of the first coupon transaction, causing any one of the network of nodes to execute the smart coupon contract against the input data after the first coupon transaction is validated and added onto the blockchain;
receive, by the processor, the second coupon transaction that includes the input data and an assigned address at which the smart coupon contract is stored; and
determine the state of the second transaction by invoking execution of the smart coupon contract indicated at the assigned address against the input data included in the second coupon transaction.

11. The first node of claim 10, wherein the executable code comprises at least one of:
a coupon modification function configured to modify the state of the second transaction;
a coupon clipping function configured to modify the state of the second transaction;
a coupon redeeming function configured to modify the state of the second transaction; or
a reward disbursement function configured to modify the state of the second transaction,
wherein the second transaction comprises at least one of a coupon clipping transaction or a coupon redeeming transaction.

12. The first node of claim 10, wherein the executable code comprises bytecode that is executable in a virtual machine platform configured in any one of the network of nodes.

13. The first node of claim 10, wherein the first coupon transaction further comprises at least one of:
an assigned address corresponding to the executable code;
a public key identifying the first node; or
coupon data.

14. The first node of claim 13, wherein the coupon data comprises at least one of:
an identifier of a manufacturer;
an identifier of the coupon;
a description of the coupon;
usage instructions for the coupon;
eligible products or services associated with the coupon; or
a redemption period of the coupon.

15. The first node of claim 10, wherein the non-transitory computer executable instructions further cause the processor to:
transfer at least one of a clipping fee independent of a discount offer value of the coupon or redeeming fee dependent of a discount offer value of the coupon to an address of the first node derived by the public key in response to invoking the executable code,
wherein the first node is configured with using a private key corresponding to the public key to access the address of the first node to retrieve the at least one of the clipping fee or redeeming fee.

16. The first node of claim 10, wherein the input data comprises at least one of:
- coupon modification caller and parameter data to invoke a coupon modification function configured to modify the state of the second transaction;
- coupon clipping caller and parameter data to invoke a coupon clipping function configured to modify the state of the second transaction;
- coupon redeeming caller and parameter data to invoke a coupon redeeming function configured to modify the state of the second transaction; or
- reward disbursement caller and parameter data to invoke a reward disbursement function configured to modify the state of the second transaction,
- wherein the second transaction comprises at least one of a coupon clipping transaction or a coupon redeeming transaction.

17. The first node of claim 16, wherein the state of the coupon clipping transaction in response to invoking the reward disbursement function comprises a transfer of a clipping fee independent of a discount offer value of the coupon for validating the coupon clipping transaction.

18. The first node of claim 16, wherein the state of the coupon redeeming transaction in response to invoking the reward disbursement function comprises a transfer of a redeeming fee dependent of a discount offer value of the coupon for validating the coupon redeeming transaction.

19. A non-transitory, tangible computer-readable medium storing machine readable instructions that, when executed by a processor of a first node communicatively coupled to a network of nodes including the first node and a second node, cause the processor to:
- generate a first coupon transaction that includes a smart coupon contract, wherein the smart coupon contract comprises executable code, defined by the first node, that permits the first node to manage and/or process usage of the coupon, wherein the executable code is configured to (i) receive input data from a second transaction that invokes the executable code and (ii) process the input data against one or more functions included in the smart coupon contract to determine a state of the second coupon transaction; and
- broadcast the first coupon transaction to a second node communicatively coupled to the network, the second node configured to apply a set of consensus rules to validate the smart coupon contract included in the first coupon transaction prior to adding the first coupon transaction onto a blockchain, wherein the consensus rules include at least solving a cryptographic puzzle involving the hash of the block of the first coupon transaction, causing any one of the network of nodes to execute the smart coupon contract against the input data after the first coupon transaction is validated and added onto the blockchain;
- receive, by the processor, the second coupon transaction that includes the input data and an assigned address at which the smart coupon contract is stored; and
- determine the state of the second transaction by invoking execution of the smart coupon contract indicated at the assigned address against the input data included in the second coupon transaction.

20. The non-transitory, tangible computer-readable medium of claim 1, wherein the executable code comprises at least one of:
- a coupon modification function configured to modify the state of the second transaction;
- a coupon clipping function configured to modify the state of the second transaction;
- a coupon redeeming function configured to modify the state of the second transaction; or
- a reward disbursement function configured to modify the state of the second transaction,
- wherein the second transaction comprises at least one of a coupon clipping transaction or a coupon redeeming transaction.

* * * * *